Nov. 18, 1969 O. T. RHYNE 3,479,617

HYBRID CIRCUIT ARRANGEMENT

Filed May 6, 1968

INVENTOR
ORVILLE T. RHYNE
BY Simon Yaffee
ATTORNEY 3,479,617
Patented Nov. 18, 1969

3,479,617

HYBRID CIRCUIT ARRANGEMENT

Orville T. Rhyne, Merritt Island, Fla., assignor to RCA Corporation, a corporation of Delaware Filed May 6, 1968, Ser. No. 726,822
Int. Cl. H01p 5/12
U.S. Cl. 333—11 8 Claims

ABSTRACT OF THE DISCLOSURE

An arrangement for coupling a two wire transmit-receive system to a four wire transmit-receive system in which there is substantially no coupling between the two sides of the four wire transmit-receive system even when the two wire transmit-receive system is variably loaded.

The invention herein described was made in the course of or under a contract or subcontract thereunder with the Department of the Air Force.

BACKGROUND

In long distant communication arrangements, it is advantageous to provide a four wire transmit-receive system comprising two one way sides, one for transmitting signals from a distant point to the local subscriber (called the four wire transmit side) and the other for transmitting the signals originating with the subscriber to the distant point (called the four wire receive side). However, for economy purposes, it is also advantageous to use a two wire transmit-receive system to connect each user or subscriber to the four wire transmit-receive system. The coupling between the two wire and the four wire systems must be such that the signal in the four wire transmit side goes only into the subscriber's two wire system and not into the four wire receive side, to prevent circulating signals in the two one way systems, resulting in noise in the two way system, and in extreme cases resulting in oscillations or singing in the four wire system. In known coupling systems, called hybrid systems and which include a balancing network, the coupling between the four wire transmit side and the four wire receive side is great enough, particularly when the two wire line is lightly or heavily loaded with reference to the load on the balancing network to produce undesirable noise in the two wire system.

It is an object of this invention to provide an improved hybrid system.

It is a further object of this invention to provide a hybrid system in which the noise level in the two wire system due to coupling between the two sides of the four wire system to the two wire system is reduced even when the two wire system is variably loaded.

SUMMARY

In accordance with the invention, voltage limiting means are included in the coupling between the two wire system and the four-wire system and also between the two sides of the four wire system in such manner that signals will not pass from the four wire transmit side to the four wire receive side even when, due to loading of the two wire system, unbalance results between the two wire system and the balancing network which forms a part of the coupling.

BRIEF DESCRIPTION OF THE DRAWING

The invention will be better understood upon reading the following description in connection with the accompanying drawing in which.

DESCRIPTION

Figure 1:
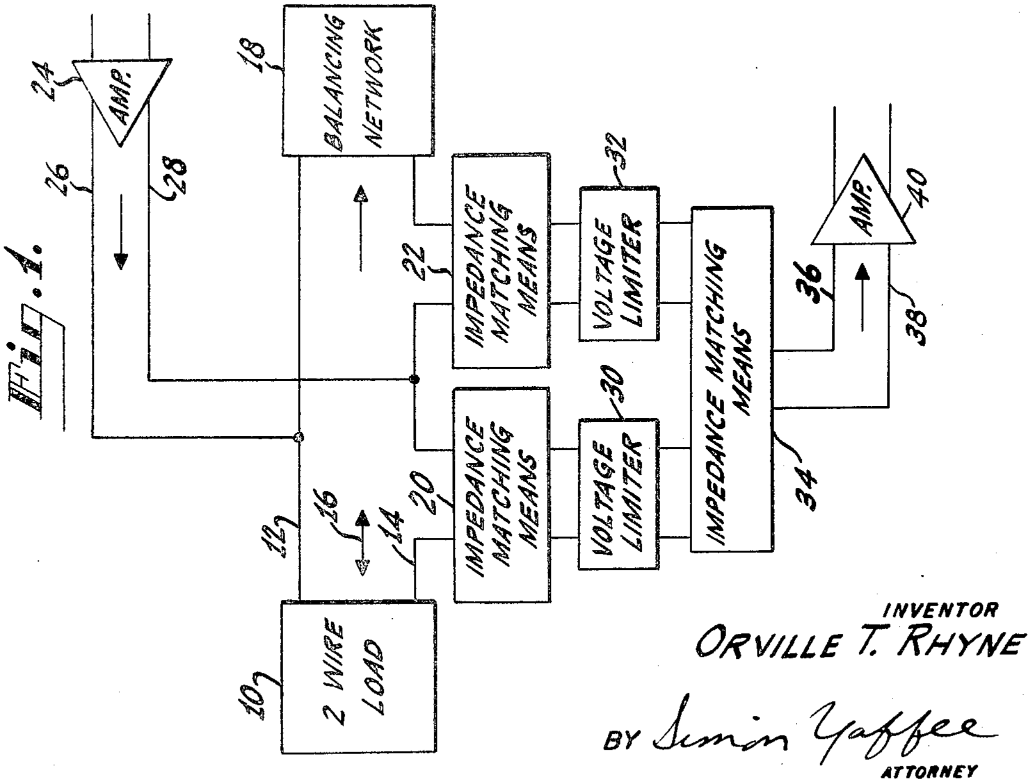
FIGURE 1 is a circuit diagram in block form of a hybrid circuit arrangement according to this invention.

Turning to FIGURE 1, a two wire terminal station 10 is provided which, in a known manner, includes means to apply locally produced signals to the two wires 12 and 14 and which includes means to reproduce signals coming in on the two wires 12 and 14, as indicated by the double headed arrow 16. The wire 12 continues to one terminal of a balancing network 18, and the wire 14 continues through two identical impedance matching means 20 and 22 in series to the other terminal of the balancing network 18. A signal which is produced at a distant point (not shown) may be applied to the input terminals of an amplifier 24, called a transmit amplifier, and these signals, after amplification by the amplifier 24 are applied to wires 26 and 28 comprising part of the four wire transmit side. The wire 26 is connected to the wire 12 and the wire 28 is connected to the portion of the wire 14 that extends between the impedance matching devices 20 and 22. Two identical voltage limiters 30 and 32 and a third impedance matching means 34 having four input terminals and two output terminals are provided. The voltage limiter 30 is connected between the output terminals of the impedance matching means 20 and two of the input terminals of the impedance matching means 34. The voltage limiter 32 is connected between the output terminals of the impedance matching means 22 and the remaining two of the input terminals of the impedance matching means 34. The output terminals of the impedance matching means 34 are connected by wires 36 and 38 comprising part of the four wire receive side, to the receive amplifier 40, for transmission of signals to the distant point.

The balancing network 18 is so made that it has exactly the same impedance as the load 10, whereby any signals from the amplifier 24 divide evenly between the load 10 and the network 18. Since the impedance matching devices 20 and 22 are identical, the voltage appearing at their output terminals due to the signals on the line 26 and 28 are identical when the two wire load device 10 is not lightly or heavily loaded with reference to the load on the balancing network 18. Also the output of the impedance matching devices 20 and 22 are 180 degrees out of phase. The voltage limiters 30 and 32 are also identical and have 180 degrees out of phase outputs. Upon application of small equal signals to the input terminals of the impedance devices 20 and 22 which are below the limiting threshold of the limiters 30 and 32 the outputs of the limiters 30 and 32 are identical and 180 degrees out of phase, due to the fact that their inputs are identical. However, when the conditions are such that the terminal load 10 is lightly or heavily loaded with respect to the loading on the balancing network 18, the voltage drop therein is no longer the same as the drop in the balancing network 18. Therefore, signals arriving by the wires 26 and 28 do not divide evenly between the load 10 and the balancing network 18 under these conditions. Since the voltage limiters 30 and 32 provide identical outputs for all values of input signals above a threshold value, the voltage applied to the impedance matching means 34 by the limiters 30 and 32 is the same even under these conditions. Therefore, the coupling of the four wire transmit side to the four wire receive side is substantially zero at all times. The output of the voltage limiters 30 and 32 are combined in the impedance matching means 34 and applied to the receive amplifier 40 for transmittal of the signals applied via the two wire load 10 to a distant point, however without any noise that would have been created by the coupling between the four wire transmit side and the four wire receive side.

Figure 2:
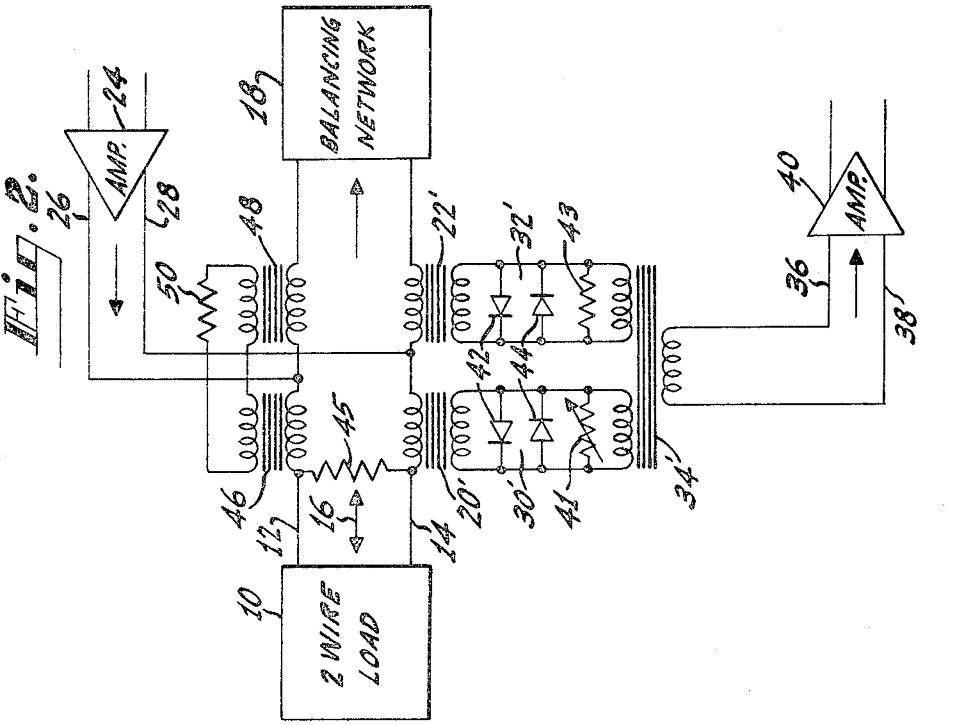
FIGURE 2 is a circuit diagram of the system of FIGURE 1 shown in more detail.

Similar elements similarly connected in FIGURES 1 and 2 have been given the same reference characters. One type of impedance matching means 20 or 22 of FIGURE 1 is shown in FIGURE 2 to be two winding iron core transformers 20' and 22' whose primary windings are connected in series between the load 10 and the balancing network 18. One type of voltage limited 30 or 32 of FIGURE 1 is shown in FIGURE 2 as a pair of reversely connected diodes 42 and 44, each pair of diodes being connected across the secondary winding of a transformer 20' and 22'. One type of four input terminal to output terminal impedance matching means 34 of FIGURE 1 is shown in FIGURE 2 as a two primary winding, one secondary winding iron core transformer 34'. The primary windings of the transformer 34' are respectively connected across the voltage limiters 30' and 32'. The secondary winding of the transformer 34' is connected to the wires 36 and 38. A variable resistor 41 may be connected across the limiter 30' and a fixed resistor 43 may be connected across the limiter 32'. By variation of resistor 41, the balance between circuits 20', 30' and one primary winding of the transformer 34'; and 22', 32' and the other primary winding of the transformer 34' may be improved.

A resistor 45 may be connected across the terminals of the load 10. Its inclusion reduces singing and circuit oscillations at the expense of some loss of signal.

If desired, the primary windings of two identical iron core transformers 46 and 48 may be connected in series in the wire 12 between the load 10 and the balancing network 18. If desired transformers 46 and 48 may be one transformer with a tap thereon instead of the two shown. The wire 26 is connected between the primary windings of the transformers 46 and 48. The secondary windings of the transformers 46 and 48 are connected in series through a resistor 50. The transformers 46 and 48 and the resistor 50 and their connections are chosen to balance as nearly as possible the transformers 20' and 22' and the load coupled to the secondary windings of the transformers 20' and 22'. In this manner, a fully balanced configuration is provided. However, the transformers 46 and 48 and the resistor 50 may be omitted (in which case the load 10 is directly connected to the network 18 by the wire 12) without substantially increasing the coupling of the four wire transmit side 24, 26 and 28 to the four wire receive side 36, 38 and 40.

Since many modifications of the disclosed hybrid connection system will be apparent to a person skilled in the art, the above description is to be taken as illustrative and not in a limiting sense.

What is claimed is:

1. A hybrid circuit arrangement comprising,

- a pair of connections between a load and a balancing network,
- a pair of impedance matching means serially connected in one of said connections,
- a third connection to a point on the other of said connections,
- a fourth connection to a point between said pair of impedance matching means,
- a respective voltage limiter coupling to each of said pair of impedance matching means, and
- a third impedance matching means coupled to both of said voltage limiters.

2. The invention as expressed in claim 1 in which said third impedance matching means has two output terminals and in which said third and fourth connection and said two output terminals comprise a four wire transmit-receive system.

3. The invention as expressed in claim 1 in which said pair of impedance matching means comprises a pair of transformers whose primary windings are connected in series between said load and said balancing means.

4. The invention as expressed in claim 1 in which said pair of impedance matching means comprises a pair of transformers whose primary windings are connected in series between said load and said balancing means and in which said limiters are connected across the secondary windings of said transformers.

5. The invention as expressed in claim 1 in which said pair of impedance matching means comprises a pair of transformers whose primary windings are connected in series between said load and said balancing means and in which said limiters are connected across the secondary windings of said transformers and in which said third impedance matching means comprises a three winding transformer, two of the windings of said three winding transformer being respectively connected across said voltage limiters.

6. The invention as expressed in claim 1 in which said pair of impedance matching means comprises a pair of transformers whose primary windings are connected in series between said load and said balancing means and in which said limiters are connected across the secondary windings of said transformers and in which said third impedance matching means comprises a three winding transformer and in which said third and fourth connections and the terminals of the remaining winding of said three winding transformer comprise a four wire transmit-receive system.

7. The invention as expressed in claim 1 in which a resistor is connected across each of said voltage limiters.

8. The invention as expressed in claim 1 in which a resistor is connected across said load.

References Cited

UNITED STATES PATENTS 2,164,344 7/1939 Norwine ---------- 333—14 XR

ELI LIEBERMAN, Primary Examiner

MARVIN NUSSBAUM, Assistant Examiner